United States Patent [19]
Steers

[11] 3,820,662
[45] June 28, 1974

[54] BICYCLE LOCKING APPARATUS
[76] Inventor: Thomas Grant Steers, 22605 Marlin Pl., Canoga Park, Calif. 91304
[22] Filed: Jan. 18, 1973
[21] Appl. No.: 324,581

[52] U.S. Cl............... 211/5, 70/128, 70/417, 211/22
[51] Int. Cl............................................. B62h 3/08
[58] Field of Search.......... 211/4, 5, 17, 18, 19, 20, 211/21, 22; 70/60, 233, 234, 235, 417

[56] References Cited
UNITED STATES PATENTS

| 614,431 | 11/1898 | Austin................................. 70/234 |
| 614,432 | 11/1898 | Austin................................. 211/5 |
| 617,693 | 1/1899 | Shultz................................. 70/234 |
| 761,843 | 6/1904 | Lyon................................. 70/417 X |
| 3,696,647 | 10/1972 | Balicki............................ 70/417 X |
| 3,739,609 | 6/1973 | Kaufmann.......................... 211/5 X |

FOREIGN PATENTS OR APPLICATIONS

| 67,663 | 9/1948 | Denmark............................. 211/5 |
| 223,458 | 3/1943 | Switzerland......................... 70/235 |
| 870,611 | 12/1941 | France................................ 70/234 |

Primary Examiner—Roy D. Frazier
Assistant Examiner—Thomas J. Holko
Attorney, Agent, or Firm—Jack C. Munro

[57] ABSTRACT

A bicycle locking apparatus wherein the front wheel of the bicycle is to be located within an opening within a frame, a bolt to be movable from one side of the frame to the other side across the opening, the free end of the bolt to cooperate with a retaining means to lock such in its latched position, the bolt being pivotal to its latched position, a coin-operated locking means mounted within the frame to retain the bolt in the latched position, the bolt including a stranded wire cable extending throughout the interior of the bolt.

7 Claims, 8 Drawing Figures

PATENTED JUN 28 1974 3,820,662
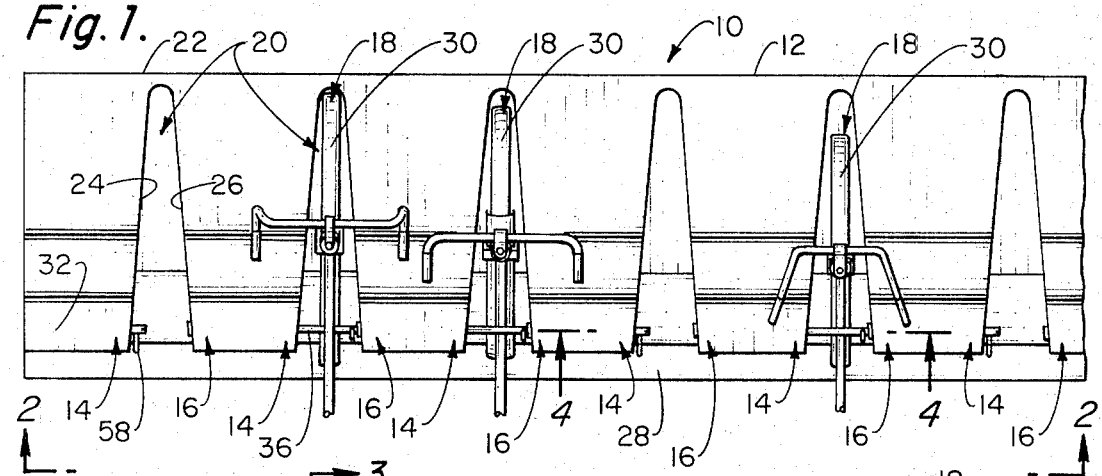
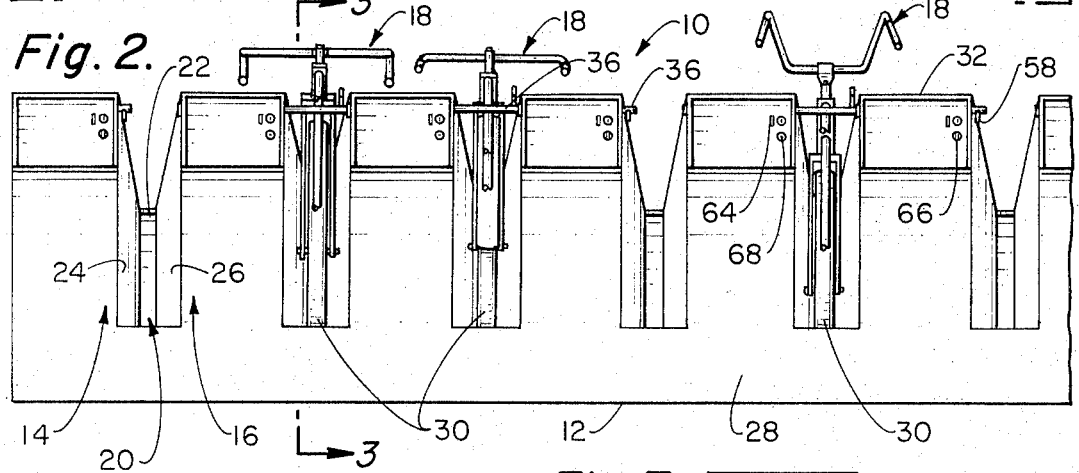
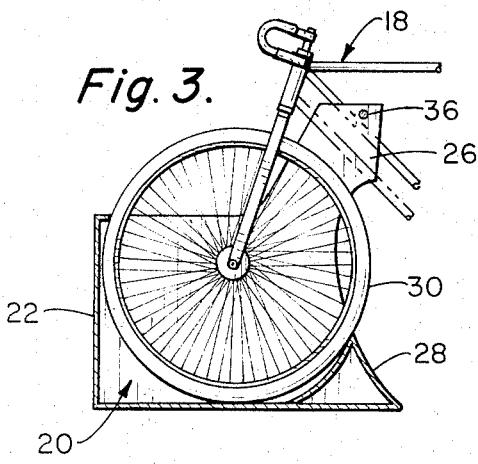
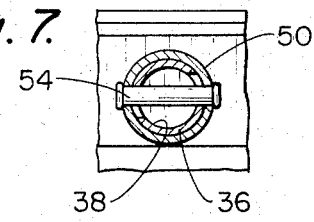
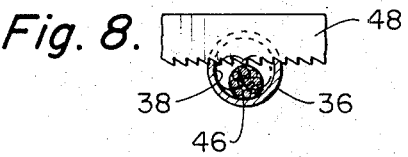
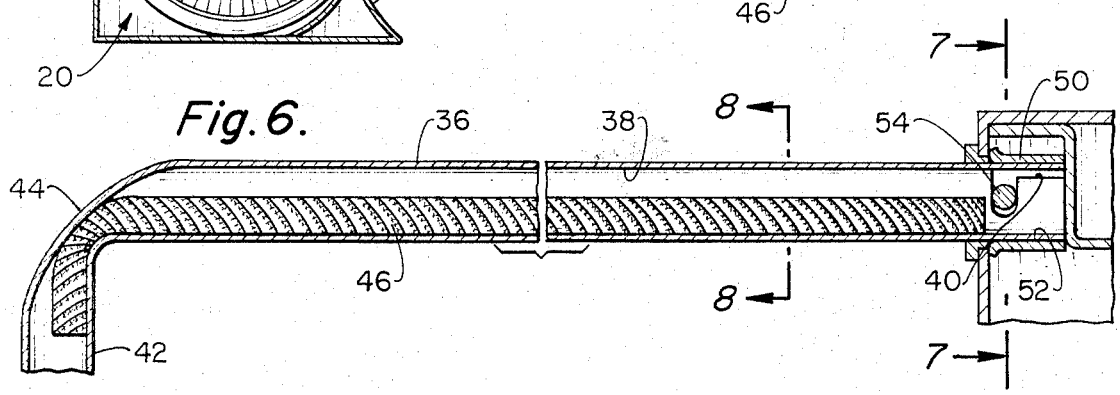

BICYCLE LOCKING APPARATUS

BACKGROUND OF THE INVENTION

The theft of small vehicles such as bicycles and motorcycles is most common. The normal procedure to help prevent the theft of such vehicles is to employ the use of a cable or chain which is to be wrapped around both the vehicle and a fixed object such as a tree or post, with the chain or cable then being locked by a padlock or other similar type of lock. A conventional lightweight chain or cable having a diameter smaller than three-sixteenths of an inch or having wires more than twenty thousandths of an inch in diameter can be readily cut by bolt cutters or other similar types of cutting apparatuses within a matter of seconds. Therefore, the use of such conventional chains and cables are proving to be ineffective to preventing stealing of such lightweight vehicles.

In an effort to further prevent thievery of small vehicles, it has been common to employ a heavier type of chain or cable. However, it is desirable with bicycles to minimize the weight of the bicycle with some racing bicycles weighing less than 10 pounds. These types of bicycles are extremely expensive, therefore proving to be the most desirable to thieves. It is not uncommon for the security chain or cable which is to be carried with the bicycle to weigh as much or more than the bicycle itself. Therefore, the advantage of having a lightweight bicycle is completely eliminated when a security chain is employed.

Since bicycling at the current time is becoming an extremely popular pasttime and people are using bicycles more and more in moving about in their daily lives, a need definitely exists for a bicycle locking apparatus which is located at places of business or other locales which people frequent. It would be desirable for these locking apparatuses to be coin operated so that a person can lock up his bicycle at the place of business and be most assured that the cycle will not be stolen while the person is running errands or handling other matters within the place of business. The fee required for the coin operation should be as small as possible with it being envisioned that 25 cents is adequate.

SUMMARY OF THE INVENTION

The bicycle locking apparatus of this invention employs the use of a frame which comprises a first sheet metal compartment and a second sheet metal compartment with an opening located therebetween. The front wheel of a bicycle is to be placed within the opening with a portion of the frame of the bicycle also extending within a portion of the opening. A locking bolt is to be movable from the first compartment across the opening through or above the bicycle frame and to be located within the second compartment. The free end of the bolt includes a bayonet slot assembly which cooperates with a pin mounted within a cup located within the second compartment. With the pin cooperating within the bayonet slot, the locking bolt is pivoted 90° thereby preventing withdrawal movement of the bolt from the second compartment. A coin activated locking means is mounted within the first compartment and with the bolt pivoted to its ninety degree position and a coin inserted within the locking means, a pawl is extended to restrain the bolt and prevent pivoting movement of the bolt in the opposite direction. The bolt is substantially cylindrical and includes a hollow chamber within which it is to be located a stranded wire cable. The stranded wire cable makes the conventional cutting through the bolt by means of a saw or the like extremely difficult.

BRIEF DESCRIPTION OF THE DRAWINGS

FIG. 1 is a plan view of the bicycle locking apparatus of this invention;

FIG. 2 is a front view of the locking apparatus of this invention taken along line 2—2 of FIG. 1;

FIG. 3 is a cross-sectional view through the locking apparatus of this invention taken along line 3—3 of FIG. 2;

Figures 4, 5:
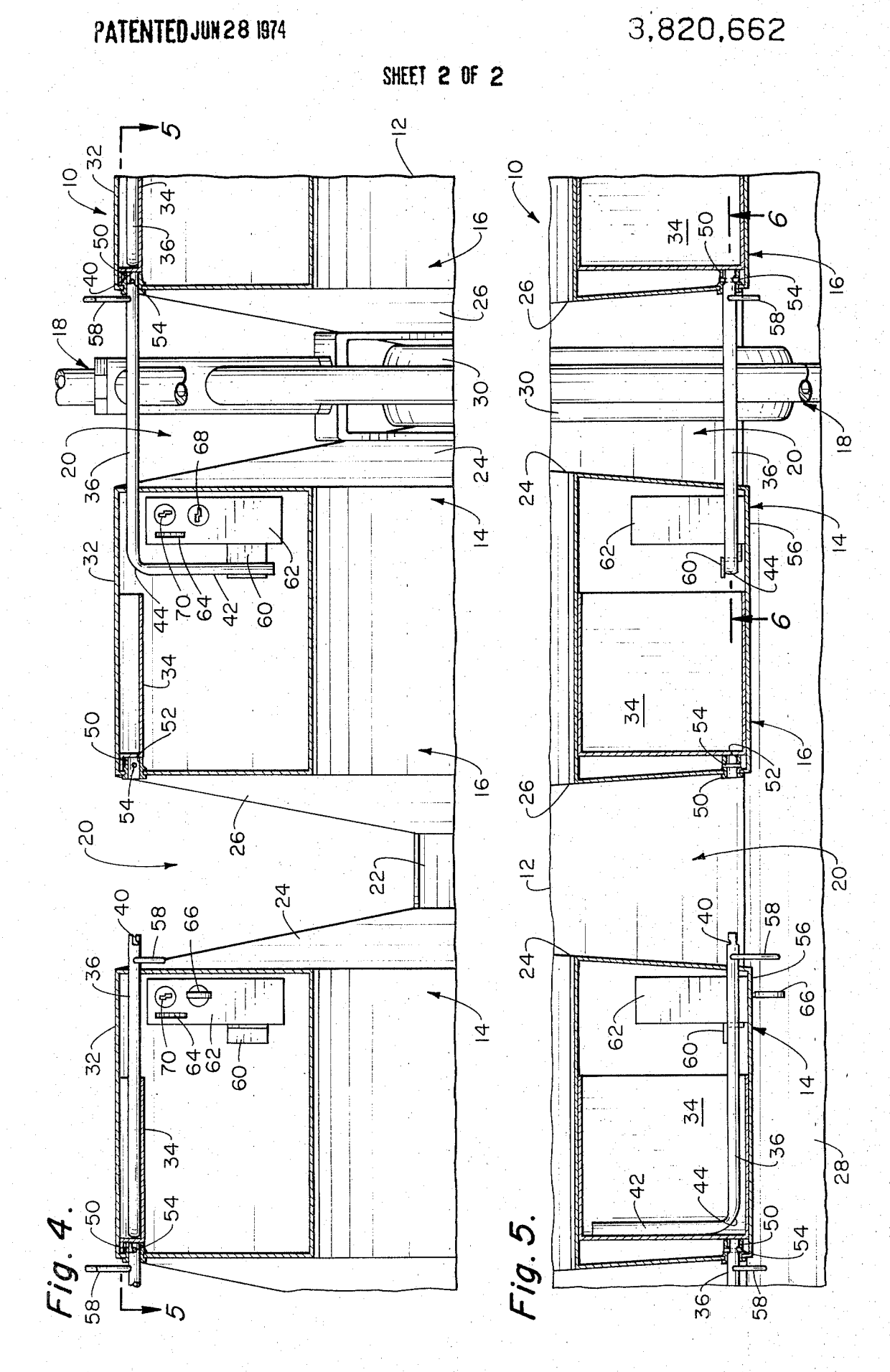

FIG. 4 is an enlarged front view of the bicycle locking apparatus of this invention;

FIG. 5 is a cross-sectional view taken along the line 5—5 of FIG. 4;

FIG. 6 is a cross-sectional view through the locking bolt included within the locking apparatus of this invention taken along line 6—6 of FIG. 5;

FIG. 7 is a cross-sectional view taken along line 7—7 of FIG. 6; and

FIG. 8 is a cross-sectional view taken along line 8—8 of FIG. 6 showing the cable located within the bolt while someone is attempting to cut such with a saw.

DETAILED DESCRIPTION OF THE SHOWN EMBODIMENT

Referring particularly to the drawings, there is shown in FIG. 1 the apparatus 10 of this invention which includes a frame 12 which is divided into a plurality of first sections 14 and a plurality of second sections 16. It is to be noted that within the drawings a plurality of locking compartments are shown within a given locking apparatus 10. Actually, by referring to FIG. 1, there are shown six such locking compartments, each being capable of accommodating a bicycle 18. The apparatus 10 of this invention is constructed so that the apparatus will accommodate practically every known type of bicycle. By referring particularly to FIGS. 1 and 2 of the drawings, it can be seen that three different types of bicycles are shown located within different compartments. The apparatus 10 of this invention is designed to also accommodate either the male version or the female version of bike. Reference is to be had specifically to FIG. 3 of the drawings wherein the male bike is shown in solid lines with the female type of bike being shown in phantom line. It is considered to be within the scope of this invention to accommodate any known type of conventional bicycle structure.

Separating each of the sections 14 and 16 is an opening 20. It is to be noted that the sections 14 and 16 of adjacent compartments are joined together in an integral manner and intend to show that such are a single section. In actuality they are constructed into a single unit but for purposes of description, they will be described as comprising separate sections.

The frame 12 is shown constructed of sheet metal to form each of the sections 14 and 16. It is considered to be within the scope of this invention to construct the frame 12 of other than sheet metal such as, for example, a metal pipe frame.

The opening 20 is closed at the aft end by a back wall 22 and is closed at the sides by side walls 24 and 26. The front portion of the opening 20 is substantially open and has at its lower end thereof the ramp 28. The ramp 28 is to facilitate entry and removal of the wheel 30 of the bicycle 18.

Mounted interiorly within each of the first sections 14 and adjacent the top wall 32 is a shelf 34. The shelf 34 is adapted to retain the aft end of a latching bolt 36. The latching bolt 36 is elongated and is hollow forming an interior chamber 38. The outer end or free end of the bolt 36 includes an aligned pair of bayonet slots 40. The bayonet slots 40 are substantially mirror images of each other with the base leg portion of each L-shaped bayonet slot being of a length so as to permit 90° pivotal movement of the bolt 36. The inner end 42 of the bolt 36 is formed at a ninety-degree angle with respect to the main portion of the bolt 36. The bend 44 of the bolt 36 is decreased in cross-sectional area so as to crimp the inner end of a stranded wire cable 46 which is located within the chamber 38. The free end of the cable 46 is unattached to the bolt 36 and is to terminate directly adjacent the bayonet slots 40. It has been found to not be necessary to attach the free end of the cable 46 to the bolt 36. However, it is considered to be within the scope of this invention to so attach such if desired.

The size of the cable 46 is of a diameter approximately one-half the diameter of chamber 38. Also, the size of each of the strands within the cable 46 should be in the area of one-quarter of an inch to three-sixteenths of an inch. The reason for this is that if anyone attempts to cut through the bolt 36 as by means of a saw 48 such as shown in FIG. 8 of the drawings, although the cutting through of the metal wall of the bolt 36 can be easily accomplished, once the saw comes into contact with the cable 46, the cable will tend to move fore and aft in the chamber 38, thereby hindering the sawing movement.

Mounted within each of the second sections 16 is a cup 50 which includes an interior recess 52. Transversely mounted through the recess 52 to the cup 50 is a pin 54. With the latching bolt 36 in the extended position where the free end of such communicates within the recess 52, the pin 54 is adapted to cooperate within the bayonet slots 40. With the pin located at the base of the bayonet slots 40, the bolt 36 is capable of being pivoted ninety degrees. Upon such occurring, the bolt 36 will be locked in position within section 16. This makes it difficult for any unauthorized person to remove the bolt 36 from the second section 16.

With the bolt 36 so pivoted, the end 42 has been moved adjacent the front wall 56 of its respective first section 14. To assist in the manual pivoting movement of the latching bolt 36, a handle 58 is provided which is attached to the bolt 36 and extends laterally therefrom. A latching pawl 60 is adapted to be extended and prevent return pivoting movement of the latching bolt 36.

The latching pawl 60 is mounted within a latching device housing 62. The latching device housing 62 includes therein a conventional coin-operated latching device. Such coin operated latching devices are well known and need not be described here in detail. Such latching devices are commonly used in storage compartments located in bus depots, train stations, and airports. The latching device is to be activated by a coin being inserted through slot 64 within the housing 62. It is envisioned that the coin will be either a dime or a quarter. However, the selection of this is clearly a matter of choice. When the proper coin has been inserted, the latching pawl 60 may be extended by rotation of a key 66. Once the key 66 is removed, the latching pawl 60 remains in the extended position. Key 66 cooperates with a keyway slot 68 formed within the housing 62.

To operate the apparatus 10 of this invention, a person positions a bike within the opening 20. The operator then grasps the handle 58 and moves the latching bolt 36 across the opening 20 and either through or over the frame of the bicycle 18. The free end of the bolt 36 is inserted within the recess 52 until the pin 54 is inserted within the bayonet slots 40. The bolt 36 is then pivoted ninety degrees. At this time the operator places a coin within the slot 64, twists the key 66 which causes extension of the latching pawl 60 to prevent retracting pivoting movement of the latching pawl 36. The operator then places the key 66 upon his person.

Upon the person coming back and desiring to remove the bike from the apparatus 10, the person then reinserts the key within the slot 68 and twists such back to its original position. Latching pawl 60 is then retracted which permits the pivoting of the latching bolt 36. The latching bolt 36 is then moved onto its shelf 34 which then permits the bicycle 18 to be withdrawn from the opening 20.

If a person inadvertently loses the key 66 or if a person believes that by purporting to lose the key 66 he will then have continuous access to the particular stall and thereby be able to steal a bicycle which is located in a stall at a future date, to avoid this the following procedure is to be accomplished. A master key, not shown, is to be inserted within the keyway slot 70. This permits opening of housing 62. A new key tumbler, not shown, is to be substituted for the old key tumbler, thereby making the old key obsolete. The housing 62 is then reclosed. The person who has either lost his key 66 or has intentions to purposely retain the key is charged the fee for this service to cover the cost of the new key tumbler.

What is claimed as new in support of Letters Patent is:

1. Bicycle locking apparatus comprising:
   a frame;
   an opening extending within the confines of said frame, said frame divided into a first section and a second section located on each side of said opening;
   a bolt mounted within one of said sections, said bolt being movable to extend within the confines of the other of said sections, said bolt being elongated and having a central axis;
   a locking means mounted within one of said sections, said locking means having a latching pawl, said latching pawl movable between an extended position and a retracted position, with said bolt extended within the confines of the other of said sections and with said latching pawl in said extended position, said bolt is prevented from retracting movement;
   retaining means attached to said other of said sections, the free end of said bolt having cooperating means, said cooperating means to engage said retaining means when said bolt is extended within the confines of said other of said sections;
   said retaining means comprises a pin, said cooperating means comprises a bayonet slot assembly, with said pin cooperating within said bayonet slot assembly said bolt to be pivotal about said central axis thereby preventing retracting movement of said bolt from said other of said sections.

2. Bicycle locking apparatus as defined in claim 1 wherein:
said bolt being mounted within the same said section that said locking means is mounted.

3. Apparatus as defined in claim 1 wherein:
said first section comprises a completely encased sheet metal compartment with said second section also comprising a completely encased sheet metal compartment, with said pawl in said extended position and said bolt is extended, a portion of said bolt is located between said pawl and a wall of the said compartment.

4. Apparatus as defined in claim 1 wherein:
said locking means being actuated by a key, said key being removable from said locking means by a coin-operated mechanism.

5. Bicycle locking apparatus comprising:
a frame;
an opening extending within the confines of said frame, said frame divided into a first section and a second section located on each side of said opening;
a bolt mounted within one of said sections, said bolt being movable to extend within the confines of the other of said sections, said bolt being elongated and having a central axis;
a locking means mounted within one of said sections, said locking means having a latching pawl, said latching pawl movable between an extended position and a retracted position, with said bolt extended within the confines of the other of said sections and with said latching pawl in said extended position, said bolt is prevented from retracting movement;
retaining means attached to said other of said sections, the free end of said bolt having cooperating means, said cooperating means to engage said retaining means when said bolt is extended within the confines of said other of said sections;
said bolt being cylindrical in cross-sectional configuration and includes an elongated hollow chamber, an elongated flexible member located within said chamber, the end of said member adjacent the free end of said bolt being unattached to said bolt, one end of said member being attached to said bolt by crimping of said bolt about said member, whereby said member is to make it difficult to cut through said bolt.

6. Apparatus as defined in claim 5 wherein:
the diameter of said member being approximately one-half the diameter of said bolt.

7. Bicycle locking apparatus comprising:
a frame;
an opening extending within the confines of said frame, said frame divided into a first section and a second section located on each side of said opening;
a bolt mounted within one of said sections, said bolt being movable to extend within the confines of the other of said sections, said bolt being elongated and having a central axis;
a locking means mounted within one of said sections, said locking means having a latching pawl, said latching pawl movable between an extended position and a retracted position, with said bolt extended within the confines of the other of said sections and with said latching pawl in said extended position, said bolt is prevented from retracting movement;
said bolt being cylindrical in cross-sectional configuration and includes an elongated hollow chamber, a cable located within said chamber, whereby said cable is to make it difficult to cut through said bolt;

the end of said cable adjacent the free end of said bolt being unattached to said bolt; and
one end of said cable being attached to said bolt by crimping of said bolt about said cable.

* * * * *